United States Patent [19]

Mabie

[11] Patent Number: 5,772,551
[45] Date of Patent: Jun. 30, 1998

[54] DUAL FLEXIBLE BITE CONNECTOR

[75] Inventor: Norman H. Mabie, Claremont, N.H.

[73] Assignee: L.M. & L. Corporation, Claremont, N.H.

[21] Appl. No.: 639,770

[22] Filed: Apr. 29, 1996

[51] Int. Cl.⁶ .................................................. F16G 5/00
[52] U.S. Cl. .......................... 474/256; 24/33 P; 411/510; 403/294
[58] Field of Search ................................. 474/256, 255, 474/253, 237, 273; 24/31 B, 31 C, 31 R, 33 P; 403/292, 294, 291; 285/240, 239; 411/510, 509

[56] References Cited

U.S. PATENT DOCUMENTS

| | | |
|---|---|---|
| 1,271,014 | 7/1918 | Bower . |
| 2,716,275 | 8/1955 | Matthysse ................................. 29/459 |
| 3,157,056 | 11/1964 | Gray et al. ................................. 74/238 |
| 3,461,733 | 8/1969 | Peterson ................................... 74/238 |
| 3,501,971 | 3/1970 | Peterson ................................... 74/231 |
| 3,605,201 | 9/1971 | Peterson ................................. 24/31 C |
| 3,922,759 | 12/1975 | Mabie ..................................... 24/31 B |
| 5,017,182 | 5/1991 | Mabie ..................................... 474/294 |
| 5,073,155 | 12/1991 | Mabie ..................................... 474/256 |
| 5,261,756 | 11/1993 | Kohn ...................................... 403/298 |
| 5,323,554 | 6/1994 | MacDonald ............................... 40/633 |
| 5,439,285 | 8/1995 | Lautenschlager ....................... 312/348 |

*Primary Examiner*—Roger J. Schoeppel
*Attorney, Agent, or Firm*—Pearson & Pearson

[57] ABSTRACT

A connector having dual parallel biting edges at each end of the connector for locking a portion of belting ends into the connector. The height of the biting edges and a centering ring is larger than the transverse dimension of the cylindrical body of the connector and the transverse dimension of recesses at the end portions of an endless belt. The endless belt is formed when the connector is inserted into each end of a finite length of hollow tubing or solid tubing with recesses at each end.

16 Claims, 3 Drawing Sheets

DUAL FLEXIBLE BITE CONNECTOR

BACKGROUND OF THE INVENTION

1. Field of the Invention

This invention generally relates to power transmission and more particularly to an endless belt assembly having a connector with a significantly increased linear belting load capability.

2. Description of Related Art

The advent of extruded lengths of polymeric material has been accompanied by efforts to adapt such materials to endless belt applications. A number of fastening means were available for the purpose of connecting two free ends of other types of belting together to form a continuous length. Such methods, however, left much to be desired when applied to tubing. Specifically, these fastening means normally required special equipment and techniques that were difficult to apply on equipment where there was little room to work and where the belt had to be formed in situ.

U.S. Pat. Nos. 3,461,733 and 3,501,971, disclose major improvements in such connectors for endless belt applications using polymeric tubing. The former patent discloses a novel connector in combination with a tough elastomer belt. The connector comprises a central shank or shaft and outwardly facing gripping heads extending from the end of the shaft. Each gripping head has a conoidal or pyramidal shape. The latter patent discloses improvements in such connectors that include a belt-seizing rib for improving the bite between the connector and the tubing. In general, the inventions disclosed in those patents have been highly successful.

Yet the experience gained with extended use of such connectors has identified some limitations. First, an upper load limit exists for a given tubing material. This load limit lies below the tension requirements for a number of applications. Secondly, a number of new materials could be applied to endless belt construction. However, these connectors have not worked successfully with such materials. Thus, potential applications for endless belts exist that the prior inventions have not been able to satisfy.

U.S. Pat. No. 3,922,759 discloses two embodiments of a connector comprising a gripping member which is easily flexed away from the direction of entry into tubing to facilitate such entry. In one embodiment the gripping member is molded; in another, the connector comprises discrete pieces. The molded coupling insert comprises gripping heads integrally formed at the extremes of a central cylindrical body. The gripping heads comprise fluted gripping rings or integral annular flanges. One of the flanges is flexible with respect to the axis of the central cylinder body. The ring is also tapered to facilitate insertion of the connector into a belt. After insertion, when tension is applied to the belt assembly, the biting ring formed by such a flange flexes outwardly or forwardly until it intercepts an outer stop ring and bites into the belt. In the alternate construction, an internally threaded cylinder body receives machine screws and flex washers. The flex washers are radially divided to form flexible segments that flex toward the direction of the cylinder when the connector is being inserted into the tube and flex outward into a biting engagement with the tubing material when tension is applied.

This approach achieved its objectives of improving load characteristics and ease of insertion. However, it was found that the increased holding power realized with these connectors did not justify associated increased manufacturing costs. As a result, connectors, such as shown in U.S. Pat. Nos. 3,461,733 and 3,501,971, have continued to be the connectors of choice for endless belt applications. This acceptance continues despite the load and material limitations that foreclose a number of applications for endless belts formed by polymeric tubing.

U.S. Pat. No. 5,017,182 discloses an endless belt formed by a connector and a finite length of hollow tubing or solid tubing with recesses at each end. The connector is characterized by a biting edge that has a larger diameter than the inside diameter of the tubing. It is readily flexible away from the direction of insertion of the edge of the tube. The biting edge is formed as a feathered or an erose outlying portion of the base at each of two gripping heads. Once the gripping heads are inserted, tension on the tubing causes the feathered edges and adjacent portions of the gripping head to bite into the internal wall of the tubing and form an improved grip therewith.

U.S. Pat. No. 5,073,155, discloses an integral connector for joining recessed end portions of a flexible belt of resilient material thereby to form an endless belt assembly. The connector comprises an elongated, axially extending central body portion 121 having a given transverse dimension and a plurality of axially spaced gripping head portions at each end of said central body portion, each gripping head portion being rigid and bounded by a tapered surface and by a base planar surface with a transverse dimension that exceeds that transverse dimension of the recesses at the end portions of the belt and of the central body portion.

SUMMARY

Accordingly, it is therefore an object of this invention to provide an improved endless belt connector having the ability to handle double the lineal belting loads of the prior art connectors.

It is another object of this invention to provide an endless belt connector that locks a portion of each end of the belting into the connector.

It is a further object of this invention to provide an improved transmission means in which a connector provides an improved power ring bite into tubing material for endless belts.

It is still another object of this invention to provide an improved transmission means with an easily connected endless belt and connector construction that is adapted for a wide range of endless belt materials.

These and other objects are accomplished by an integral connector for joining recessed end portions of a flexible belt of resilient material thereby to form an endless belt assembly, the connector comprising an elongated, axially extending central body portion having a given transverse dimension and at least two axially spaced biting head portions at each end of the central body portion, each of the biting head portions being rigid and formed by a tapered surface and by a base planar surface with a transverse dimension that exceeds the transverse dimension of the recesses at the end portions of the belt and of the central body portion, each of the outer biting head portions having the tapered and base planar surfaces extending toward a first intersection about the periphery of the outer biting head portions, and having a continuous outlying, feathered edge section integrally formed at the first intersection, each of the inner biting head portions having the base planar surface extending to a height approximately equal to the height of the outer biting head portions with a first side tapering to the height in the direction of the nearest one of the outer biting head portions and extending to an intersection with a second side to form about the periphery of each inner biting head portions a continuous outlying feathered edge integrally formed at the second intersection, the tapered and base planar surfaces of each of the outer biting head portions defining predetermined angles of such first intersections, and the tapered and base planar surfaces of each of the inner biting head portions defining predetermined angles of the second intersection, the outlying feathered edge sections being flexible about the intersections to provide multiple, spaced, locked-in engagements, between the connector and the flexible belt at each recessed end. The angle of intersection of the outer biting head portions is greater than the angle of intersection of the inner biting head portions. The angle of intersection of the outer biting head portions is less than the angle of intersection of the inner biting head portions. The connector includes a centering ring portion for limiting the position of the connector means in an endless belt means circumscribes the central body portion at an axial midpoint thereof.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
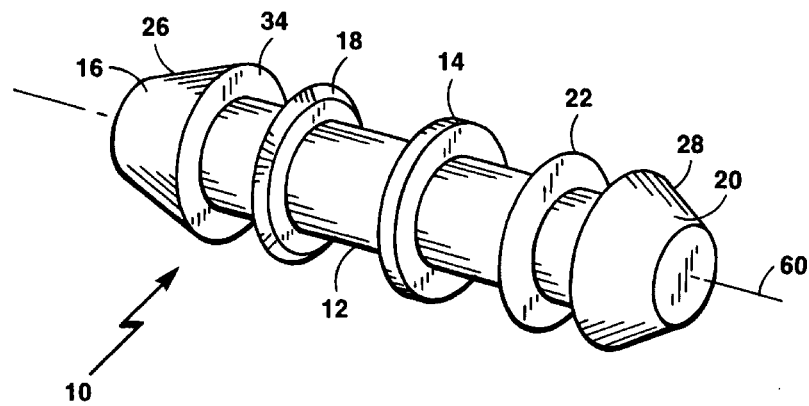
FIG. 1 is a perspective view of an improved belt connector with a dual flexible bite at each end.

Referring to FIG. 1, a perspective view is shown of a dual flexible bite connector 10 constructed in accordance with this invention. The connector 10 is an integral element that includes a central cylindrical base portion or body 12 and a centering ring 14. The connector 10 comprises a first biting head 16 on one end of the connector 10 and a second biting head 18 axially spaced apart from said first biting head 16 positioned in the direction of the centering ring 14. The other end of the connector 10 comprises a third biting head 20 and a fourth biting head 22 which is axially spaced apart from the third biting head 20 in the direction of the centering ring 14. The first biting head 16 and the third biting head 20 are generally formed with some conoidal or pyramidal shape. Conoidal shapes are particularly adapted for facilitating the insertion of the connector 10 into a belt and for ease of manufacturing. The connector 10 is made of metal.

Figure 2:
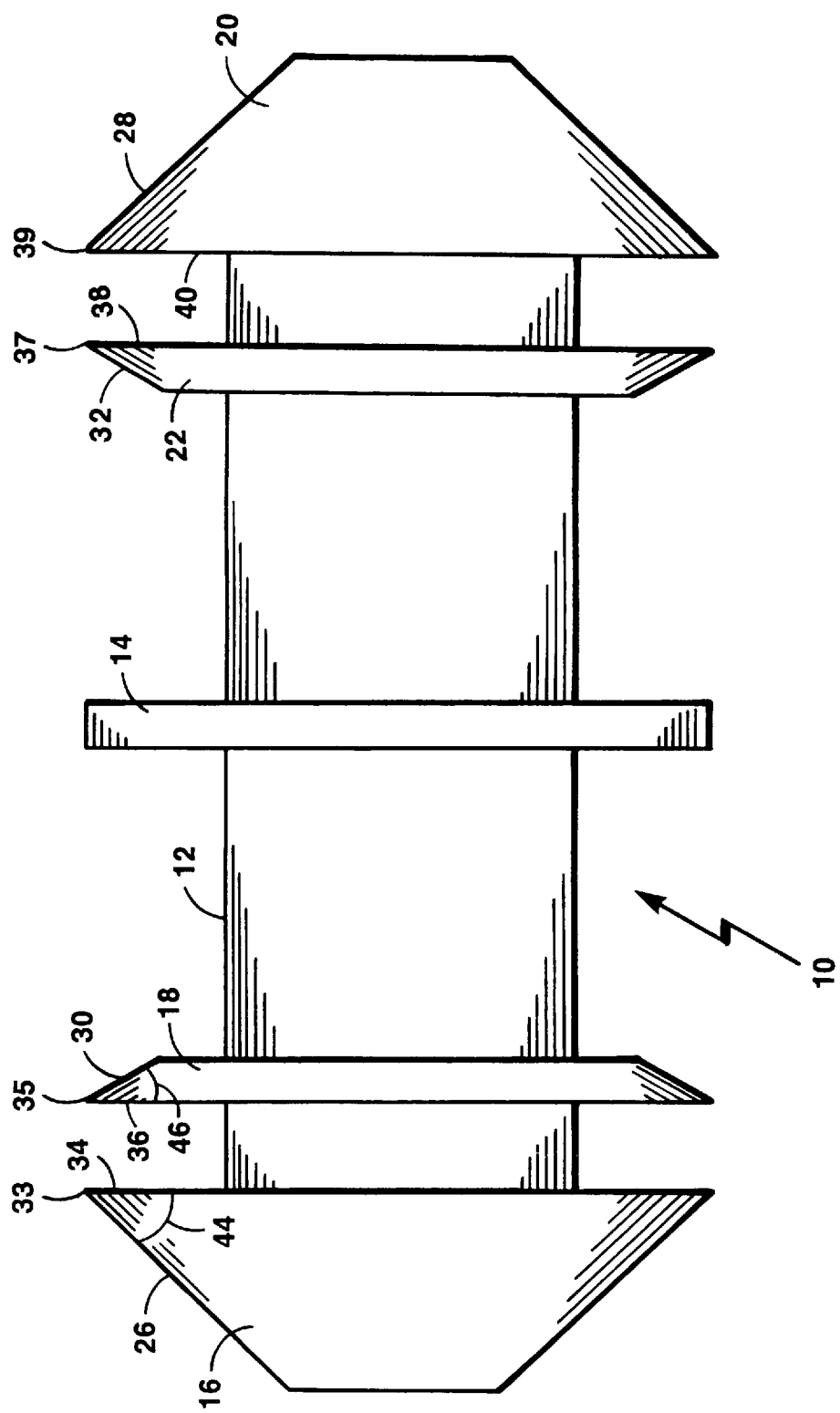
FIG. 2 is a plan view of the improved belt connector shown in FIG. 1.

Referring now to FIG. 2, a plan view is shown of the dual flexible bit connector 10. The first biting head 16 has a frustoconical shape with the larger diameter end 34 facing the second biting head 18. The second biting head 18 also has a frustoconical shape with the larger diameter end 36 facing and parallel to the larger diameter end 34 of the first biting head 16. The sloping portion 26 of the first biting head 16 is approximately forty-five degrees 44 from the larger diameter end 34. The sloping portion 30 of the second biting head 18 is approximately thirty degrees 46 from the larger diameter end 36. The edges 33, 35 of the first biting head 16 and the second biting head 18 formed by the above angles are feathered and such angles may vary depending on the loading requirements for a particular endless belt 50. Typically the endless belt will comprise a range of resilient polymeric materials such as a "HYTREL" product sold by E I DuPont de Nemeurs & Company and other polymer and urethane products.

Still referring to FIG. 2, the third biting head 20 has a frustoconical shape with the larger diameter end 40 facing the fourth biting head 22. The fourth biting head 22 also has a frustoconical shape with the larger diameter end 38 facing and parallel to the larger diameter end 40 of the third biting head 20. The sloping portion 28 of the third biting head is approximately forty-five degrees from the larger diameter end 40 which is the same as the sloping portion 26 of the first biting head 16. The sloping portion 32 of the fourth biting head 22 is approximately thirty degrees. The edges 39, 37 of the third biting head 20 and the fourth biting head 22 respectively formed by the above angles are feathered and such angles may vary depending on the loading requirements for the particular endless belt 50.

Figure 3:
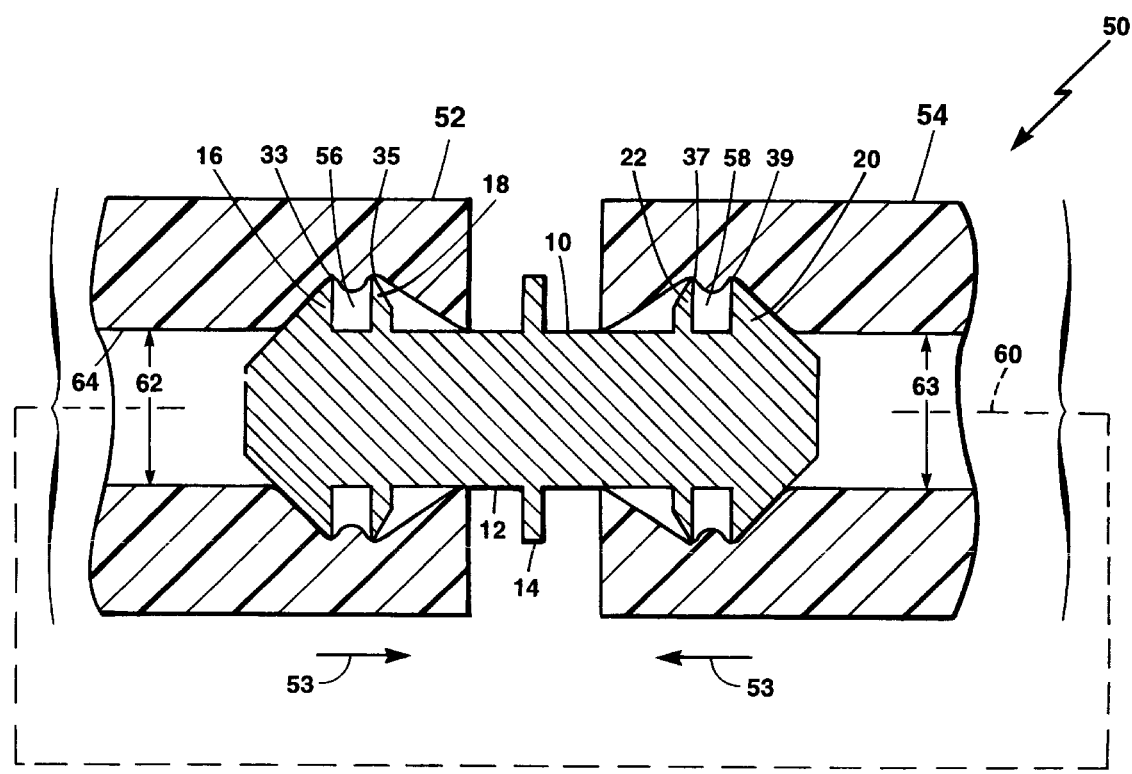
FIG. 3 is a partial cross-sectional view of an endless belt assembly including a section of a hollow endless belt positioned during the insertion of the connector shown in FIG. 1.

Referring now to FIG. 3, a partial cross-sectional view is shown of a flexible endless belt 50 assembly including tube end portions 52, 54 of a hollow endless belt positioned during the insertion of the connector 10. FIG. 3 depicts the configuration of the feathered edges 33, 35, 37, 39 when a connector 10 is being inserted into end portions 52 and 54 of the endless belt 50. A dashed line from the outer edges of the end portions 52 and 54 represents the remainder of a length of tubing. The tubing, as shown, may comprise solid material with recessed ends.

Still referring to FIG. 3, the nominal diameter of the biting heads 16, 18, 20 and 22 exceed the inner diameter of the tubing 62. As the connector 10 moves into the tube end 52, the biting heads 16 and 18 eventually engage the inner surface 64 of the tube end 52. With further insertion, the inner surface 64 stretches and glides over the conical surfaces of biting heads 16 and 18 deflecting as it passes over the space between heads 16 and 18. Similarly, the biting heads 20 and 22 eventually engage an inner surface 63 of the tube end 54. In FIG. 3, this relative motion is represented by arrows 53 that depict motion of the tube ends 52 and 54 relative to the connector.

Figure 4:
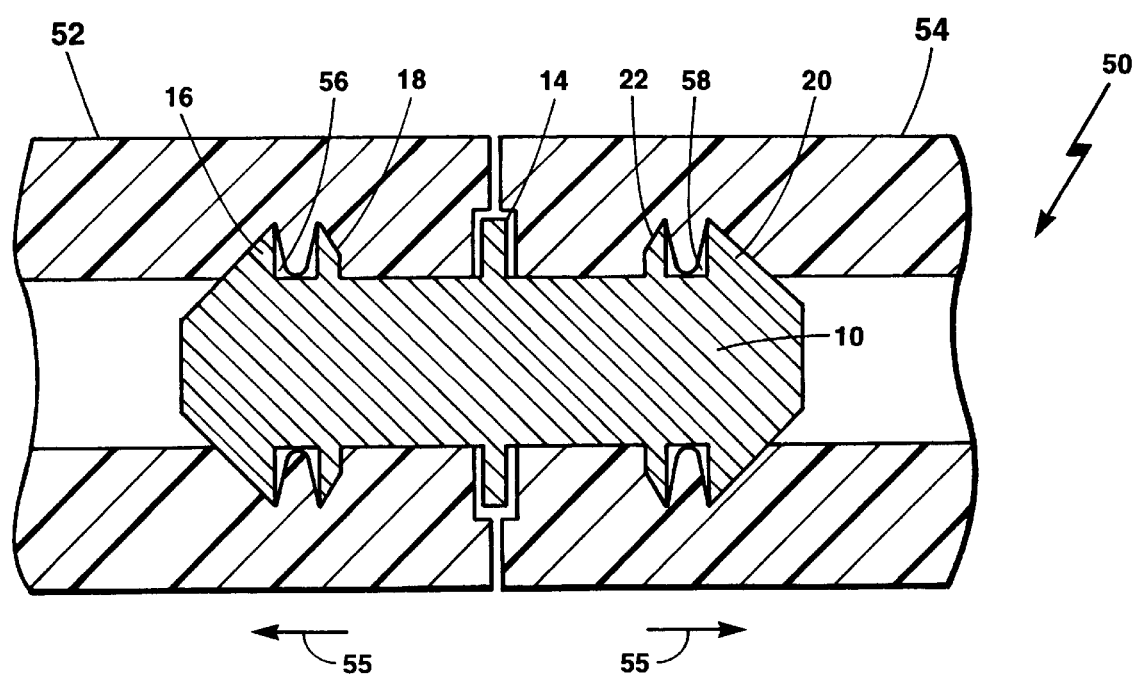
FIG. 4 is a cross-sectional view of a section of an endless belt assembly constructed in accordance with this invention while the end portions of the endless belt are in tension after insertion on the connector.

Referring now to FIG. 4, a cross-sectional view is shown of a section of an endless belt 50 assembly constructed in accordance with this invention while the end portions 52, 54 of the endless belt 50 are in tension represented by arrows 55 after insertion on the connector 10 in the direction of the arrows. The connector 10 is positioned in the hollow or recessed ends of the endless belt 50. The belt material whether urethane or polymer is locked in the space 56 between the first bite head 16 and the second bit head 18 and the space 58 between the third bite head 20 and the fourth bite head 22. This locked-in portion of the belt ends 52, 54 which are being connected provides for a lineal belting load that is approximately double that achievable with prior connectors.

Metal connectors, such as connector 10, normally are manufactured on a screw machine. As known, screw machines form finished products through a series of cutting or shaping operations. In accordance with the embodiment of this invention shown in FIG. 1 and FIG. 2, the screw machine forms the radially extending base 12 by drawing a cutting tool along a line transversely to the axis 60. Then a cut is made along an oblique line from the axis 60 toward central body 12 that corresponds to the conical surface 26. When the cutting tool is proximate with end surface 33 (i.e., at the intersection of the two surfaces 26 and 34), it is drawn radially outwardly leaving a roughened feathered edge or burr 33 about the peripheral of the radially extending base 34 as shown in FIG. 2. With this particular sequence the feathered edge 33 extends a few mils (e.g., up to 7 mils) toward the center of the base portion 12 and is outlying of the radially extending base 12. Moreover, as the tool withdraws, it produces a feathered edge 33 with a roughened surface because the feathered edge 33 is thin and flexible and not rigid.

In accordance with an alternative manufacturing process, a piece of stock is initially machined to produce the cylindrical body 12 and central ring 14 leaving cylindrical end portions. A biting head 16 is then formed by advancing a cutting tool along a line perpendicular to the axis 60. The tool has a cutting surface that is inclined at the finished angle of the conical surface 26. When the tool is positioned essentially coextensively with the biting head and advanced rapidly it produces the desired roughened feathered edge or burr 33 that extends continuously around the periphery of the biting head 16.

For a given tubing material, connector 10 constructed in accordance with FIGS. 1 through 4 have exhibited up to 50% more holding power over prior art connectors because the feathered edges 33, 35, 37 and 39 enable the biting heads 16, 18, 20 and 22 to bite into the surfaces of the ends 52 and 54 more readily, and in particular, the feathered biting edges 33, 35, 37 and 39 at each end of the connector 10 lock a portion of the belting or tubing material into the spaces 56 and 58, as shown in FIG. 4, into the connector 10. Moreover, the feathered edges 33, 35, 37 and 39 enable the connector 10 to be used over a wider range of materials. Prior art connectors have been limited to materials having durometer measurements of 50 to 85 on the Shore A scale; it has been found that this connector structure enables operations with endless belt materials having durometer ranges of 50 to 95 on the Shore A scale and 45 to 70 on the Shore D scale. This increased capability enables harder (i.e., less flexible) tubing to be incorporated in endless belts, thus broadening the range of applications for endless belts.

This invention has been disclosed in terms of a certain embodiment. It will be apparent that many modifications can be made to the disclosed apparatus without departing from the invention. Therefore, it is the intent of the appended claims to cover such variations and modifications as come within the true spirit and scope of this invention.

What is claimed as new and desired to be secured by Letters Patent of the United States is:

1. An integral connector for joining end portions of a flexible belt of resilient material thereby to form an endless belt assembly, said connector comprising:
   an elongated, axially extending central body portion having a given transverse dimension and at least two axially spaced biting head portions, an outer biting head portion and an inner biting head portion, at each end of said central body portion;
   each of said biting head portions being rigid and formed by a tapered surface and by a base planar surface with a transverse dimension that exceeds the transverse dimension of the recesses at the end portions of the belt and of said central body portion;
   each of said outer biting head portions having said tapered and base planar surfaces extending toward a first intersection about the periphery of said outer biting head portions, and having a continuous outlying edge section integrally formed at said first intersection;
   each of said inner biting head portions having said base planar surface extending to a height approximately equal to the height of said outer biting head portions with a first side tapering to said height in the direction of the nearest one of said outer biting head portions and extending to an intersection with a second side to form about the periphery of each inner biting head portions a continuous outlying edge integrally formed at said second intersection;
   said tapered and base planar surfaces of each of said outer biting head portions defining predetermined angles of such first intersections;
   said tapered and base planar surfaces of each of said inner biting head portions defining predetermined angles of said second intersection; and
   said outlying edge sections being flexible about said intersections to provide multiple, spaced, locked-in engagements, between said connector and the flexible belt at each recessed end.

2. The connector for forming an endless belt as recited in claim 1 wherein said angle of intersection of said outer biting head portions is greater than said angle of intersection of said inner biting head portions.

3. The connector for forming an endless belt as recited in claim 2 wherein said angle of intersection of said outer biting head portions is less than said angle of intersection of said inner biting head portions.

4. The connector for forming an endless belt as recited in claim 2 includes a centering ring portion for limiting the position of said connector in an endless belt circumscribes said central body portion at an axial midpoint thereof.

5. An endless belt assembly comprising:
   a. belt means having a finite length and being hollow at least at the ends thereof, and
   b. an integral connector means for joining said ends of said belt means including:
   an elongated central body portion having a given transverse dimension;
   at least two axially spaced biting head portions, an outer biting head portion and an inner biting head portion, at each end of said central body portion, each of said biting head portions being rigid and formed by an axially extending tapered surface and base planar surface with a transverse dimension that exceeds the transverse dimension of the recesses at the end portions of said belt means and of said central body portion;
   each of said outer biting head portions having said tapered and base planar surfaces extending toward a first intersection about the periphery of said outer biting head portions and having a continuously outlying edge section integrally formed at said first intersection;
   each of said inner biting head portions having said tapered and base planar surfaces extending to a height approximately equal to the height of said outer biting head portions with said tapered surfaces, tapering to said height in the direction of the nearest one of said outer biting head portions and extending to a second intersection with said base planar surfaces to form about the periphery of each inner biting head portions a continuous outlying edge integrally formed at said second intersection;

said tapered and base planar surfaces of said outer biting head portions defining predetermined angles of said first intersections;

said tapered and base planar surfaces of said inner biting head portions defining predetermined angles of said second intersection; and said outlying edge sections being flexible about said intersections to lock-in portions of said belting means between said biting head portions at each end of said connector means.

6. The endless belt assembly as recited in claim 5 wherein each of said outer biting head portions of said connector means has a conoidal shape.

7. The endless belt assembly as recited in claim 5 wherein each said outer biting head portions of said connector means has a frustoconical shape.

8. The endless belt assembly as recited in claim 5 wherein said connector means is metal.

9. The endless belt assembly as recited in claim 5 wherein said first and second intersections formed by said tapered surfaces and said base planar surfaces on adjacent axially spaced biting head portions at each end of said connector means have substantially the same angle.

10. The endless belt assembly as recited in claim 5 wherein said central body portion is cylindrical and each of said outer biting head portions tapers radially outward toward the center of said central body portion whereby said biting head portions have a conoidal slope and face outwardly with respect to said connector means.

11. The endless belt assembly as recited in claim 10 wherein each said outer biting head portions of said connector means has a tapered surface lying at substantially the same angle with respect to said central body portion.

12. The endless belt assembly as recited in claim 11 wherein a centering ring portion for limiting the position of said connector means in said endless belt means circumscribes said central body portion at an axial midpoint thereof.

13. The endless belt assembly as recited in claim 5 wherein said biting head portions of said connector means include said outer and inner biting head portions at each end of said central body portions, said first and second intersections of said tapered surfaces and said base planar surfaces of said outer and inner biting head portions having first and second angles of said intersections, respectively, that differ.

14. The endless belt assembly as recited in claim 13 wherein said first angle is greater than said second angle.

15. The endless belt assembly as recited in claim 13 wherein a centering ring portion for limiting the position of said connector means in said endless belt circumscribes said central body portion at an axial midpoint thereof.

16. The endless belt assembly as recited in claim 5 wherein said belt means comprises a resilient polymeric material.

* * * * *